(12) United States Patent  
Martinson

(10) Patent No.: US 9,355,334 B1  
(45) Date of Patent: May 31, 2016

(54) EFFICIENT LAYER-BASED OBJECT RECOGNITION

(71) Applicant: TOYOTA JIDOSHA KABUSHIKI KAISHA, Toyota-shi, Aichi-ken (JP)

(72) Inventor: Eric Martinson, Mountain View, CA (US)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 189 days.

(21) Appl. No.: 14/171,756

(22) Filed: Feb. 3, 2014

Related U.S. Application Data

(60) Provisional application No. 61/874,962, filed on Sep. 6, 2013.

(51) Int. Cl.
- *G06K 9/00* (2006.01)
- *G06K 9/62* (2006.01)
- *G06T 7/00* (2006.01)

(52) U.S. Cl.
CPC .......... *G06K 9/6202* (2013.01); *G06K 9/00214* (2013.01); *G06K 9/00362* (2013.01); *G06T 7/0079* (2013.01)

(58) Field of Classification Search
None
See application file for complete search history.

(56) References Cited

U.S. PATENT DOCUMENTS

| | | | | |
|---|---|---|---|---|
| 6,771,818 B1 * | 8/2004 | Krumm | ............... | G06K 9/00369 382/154 |
| 6,795,567 B1 * | 9/2004 | Cham | ................... | G06T 7/2033 382/103 |
| 6,973,201 B1 * | 12/2005 | Colmenarez | ....... | G06K 9/00369 382/103 |
| 7,003,136 B1 * | 2/2006 | Harville | ............. | G06K 9/00201 348/169 |
| 7,912,294 B2 * | 3/2011 | Bogoni | .................. | G06T 7/0012 382/131 |
| 8,131,011 B2 * | 3/2012 | Nevatia | ............. | G06K 9/00369 382/103 |
| 8,577,126 B2 * | 11/2013 | Jones | ...................... | G06F 3/017 348/114 |
| 2004/0153671 A1 * | 8/2004 | Schuyler | ............ | G07C 9/00111 726/9 |
| 2005/0063565 A1 * | 3/2005 | Nagaoka | ................ | B60R 21/013 382/104 |
| 2005/0094879 A1 * | 5/2005 | Harville | ............. | G06K 9/00201 382/209 |
| 2006/0018516 A1 * | 1/2006 | Masoud | ............. | G06K 9/00342 382/115 |

(Continued)

OTHER PUBLICATIONS

U.S. Appl. No. 14/171,662, filed Feb. 3, 2014, entitled "Guiding Computational Perception Through a Shared Auditory Space".

(Continued)

*Primary Examiner* — Wenpeng Chen
(74) *Attorney, Agent, or Firm* — Patent Law Works LLP

(57) ABSTRACT

In an example embodiment, a computer-implemented method is disclosed that determines a depth image; detects an object blob in the depth image; segments the object blob into a set of layers; and compares the set of layers associated with the object blob with a set of object models to determine a match. Comparing the set of layers with the set of object models can include determining a likelihood of the object blob as belonging to each of the object models and determining the object blob to match a particular object model based on the likelihood. Further, determining the likelihood of the object blob as belonging to the one of the object models can include computing a recognition score for each layer of the set of layers; and aggregating the recognition score of each layer of the set of layers.

33 Claims, 16 Drawing Sheets

(56) References Cited

U.S. PATENT DOCUMENTS

| | | | | |
|---|---|---|---|---|
| 2006/0239558 | A1* | 10/2006 | Rafii | G06K 9/00201 382/181 |
| 2006/0291697 | A1* | 12/2006 | Luo | G06K 9/00369 382/104 |
| 2007/0086621 | A1* | 4/2007 | Aggarwal | G06K 9/00369 382/103 |
| 2008/0101652 | A1* | 5/2008 | Zhao | G06K 9/00369 382/103 |
| 2009/0041297 | A1* | 2/2009 | Zhang | G06K 9/00362 382/103 |
| 2010/0034457 | A1* | 2/2010 | Berliner | G06K 9/00362 382/154 |
| 2010/0195865 | A1* | 8/2010 | Luff | G06K 9/00771 382/100 |
| 2010/0310155 | A1* | 12/2010 | Newton | H04N 13/0055 382/154 |
| 2011/0255741 | A1* | 10/2011 | Jung | G06K 9/00805 382/103 |
| 2011/0293137 | A1* | 12/2011 | Gurman | G06K 9/00201 382/103 |
| 2012/0051625 | A1* | 3/2012 | Appia | G06T 7/0059 382/154 |
| 2012/0087572 | A1* | 4/2012 | Dedeoglu | G06K 9/00771 382/154 |
| 2012/0087573 | A1* | 4/2012 | Sharma | G06K 9/00771 382/154 |
| 2013/0184592 | A1* | 7/2013 | Venetianer | H04N 7/18 600/476 |

OTHER PUBLICATIONS

Preis, et al., "Gait Recognition with Kinect", (2012): Gait Recognition with Kinect, 1st International Workshop on Kinect in Pervasive Computing, Newcastle, 2012 (4 pages).

Munsell, et al., "Person Identification Using Full-Body Motion and Anthropometric Biometrics from Kinect Videos," Lecture Notes in Computer Science vol. 7585, 2012, pp. 91-100 (10 pages).

Kuono, et al., "Person Identification Using Top-View Image with Depth Information", Software Engineering, Artificial Intelligence, Networking and Parallel & Distributed Computing (SNPD), 2012 (6 pages).

Kirchner, et al., "Head-to-shoulder signature for person recognition", IRCA, 2012 (6 pages).

Spinello, Arras, Triebel, and Siegwert, "A Layered Approach to People Detection in 3D Range Data," in Special Track on Physically Grounded AI at AAAI, 2010 (6 pages).

* cited by examiner

|  | Face Recognition | Gait Recognition | Head Recognition | Layer-based Recognition |
|---|---|---|---|---|
| Works with Depth Images | True | True | True | True |
| Works when Face is missing | False | True | True | True |
| Single Image Recognition | True | False | True | True |
| Works with missing data from head or shoulders | Maybe | Maybe | False | True |

Figure 8

EFFICIENT LAYER-BASED OBJECT RECOGNITION

CROSS-REFERENCE TO RELATED APPLICATIONS

This application claims the benefit under 35 U.S.C. §119 (e) of U.S. Provisional Application No. 61/874,962, entitled "Depth-Based Person Detection" and filed on Sep. 6, 2013, the entire content of which is incorporated herein by reference.

BACKGROUND

The present disclosure relates to object recognition.

Today many computer systems and machines rely on person recognition techniques for various different applications. In some example applications, machines and computer systems need to know if there is a human present (or which human is present) at a particular location in order to turn on/off or activate a particular program. As a further example, person recognition is often a fundamental skill in human robot interaction. In general, a robot needs to know where the person is in order to interact with them. However, in some domains the challenges are particularly difficult. In healthcare for instance, a robot that works with people needs to reliably identify the presence of people in the environment, including people that are sitting, lying down, partially occluded, or actively moving given the sensitive nature of that environment. Also, the robot needs to perform these tasks quickly and accurately, and not depend on people changing their behavior to suit the robot so as not to add to what is already likely a difficult time for them.

Many systems use various existing facial, action recognition, and other recognition techniques to recognize people. However, these techniques have limitations that prevent people recognition in less-than-optimal conditions. For instance, some depth image facial recognition techniques that exist for recognizing people depend on the subject's face, or at least eyes and/or nose, being visible in the target image in order to register the image. If the subject's face is not visible, either because the person is rotated away from the camera, or because that person's face lies fully or partially off of the screen, recognition is often not possible using these techniques.

Further, some action recognition techniques that exist can be used to recognize people by the way they walk (e.g., using gait recognition). However, these techniques require capturing the target subject's movements over some distance and/or time, which can cause an undesirable and significant lag in recognition response time. Various head recognition techniques also exist that are capable recognizing people's heads independently of their faces, provided their heads are visible in the image. However, some of these head recognition techniques rely on a camera being positioned above people's heads, which is not always feasible, especially when equipping a mobile platform. Other head recognition techniques use contour recognition. However, these techniques require having both a person's shoulders and head visible in the image, which is not always practicable, particularly when the camera and/or target subject are moving.

Other people recognition systems also exist which use geometric shapes for detecting people in 2D scan data and 3D long-range velodyne data. However, these systems are often unreliable when the detection target is in close range or occluded somehow in the image environment (e.g., by artifacts in the image, objects in the environment, etc.), and are generally unable to uniquely recognize the detection target even when detected.

Some solutions, like gait recognition, can in some cases, recognize people when both the face and part of the head or shoulders is missing. However, these solutions are unreliable because their recognition failure rate is high and they generally have slow response times because they require a sequence of images or video be analyzed.

Additionally, many existing depth-based recognition solutions have strong limitations during mobile perception. For instance, when a sensor and/or subject/object are moved, or moving, around, the relative pose of the person is constantly in flux and changing. This causes problems for face recognition, as well as head recognition because occlusions are bound to occur, and therefore recognition must be possible in their presence.

SUMMARY

According to one innovative aspect of the subject matter described in this disclosure, a system includes one or more processors and one or more memories storing instructions that, when executed by the one or more processors, cause the system to: determine a depth image; detect an object blob in the depth image; segment the object blob into a set of layers; and compare the set of layers associated with the object blob with a set of object models to determine a match.

In general, another innovative aspect of the subject matter described in this disclosure may be embodied in methods that include determining, using one or more computing devices, a depth image; detecting, using the one or more computing devices, an object blob in the depth image; segmenting, using the one or more computing devices, the object blob into a set of layers; and comparing, using the one or more computing devices, the set of layers associated with the object blob with a set of object models to determine a match.

Other aspects include corresponding methods, systems, apparatus, and computer program products for these and other innovative aspects.

These and other implementations may each optionally include one or more of the following features and/or operations. For instance, the features and/or operations include: that comparing the set of layers with the set of object models includes determining, using the one or more computing devices, a likelihood of the object blob as belonging to each of the object models, and determining the object blob to match a particular object model based on the likelihood; that determining the likelihood of the object blob as belonging to the one of the object models includes computing, using the one or more computing devices, a recognition score for each layer of the set of layers, and aggregating, using the one or more computing devices, the recognition score of each layer of the set of layers; determining, using the one or more computing devices, a curvature associated with the set of layers, wherein comparing the set of layers with the object models includes evaluating the curvature using the object models; extracting, using the one or more computing devices, one or more geometric properties for each layer of the set of layers; that comparing the set of layers with the object models includes comparing the one or more geometric properties associated with each layer of the set of layers with the object models; that the one or more geometric properties includes a multi-dimensional vector containing properties associated with layer curvature; that the one or more geometric properties reflect one or more of a size, curvature, curve fit, and shape fit; that detecting the object blob in the depth image includes detecting a plurality of blobs associated with a plurality of objects depicted by the depth image, and classifying each blob from the plurality of blobs as a person blob or other blob type based on a shape of the blob; discarding each blob from the plurality of blobs that is classified as another blob type; that the object blob is a person blob and recognizing, using the one or more computing devices, a person associated with the person blob based on the match; that the set of layers includes one or more horizontal layers; and that the sensor includes one or more of a stereo camera, a structured light camera, and a time-of-flight camera.

The novel detection technology presented in this disclosure is particularly advantageous in a number of respects. For example, the technology described herein is computationally simple and effective for detecting objects (e.g., people) in depth images with and without significant occlusions of the body; is sensor-independent; can recognize objects from a single image; can effectively recognize objects at close range even when the objects are not fully in the field of view of the camera; extends to outdoor detections even with noise-prone sensors such as stereo-vision, can recognize objects with >90% recognition precision; can in some cases be executed by a processor using multiple threads at >30 Hz without GPU acceleration; can recognize people who are sitting in chairs, or obstructed by either significant vertical or horizontal occlusions; and can generalize across different types of depth-sensors without the need for additional training.

As a further example, in human-robot interaction, robots need to be capable of detecting people at both long distances and at very close distances, which has been historically more problematic. Further, a robot companion must be able to identify its human partner even if their human partner approaches from the side or from behind an obstacle. The detection technology disclosed herein can satisfy these needs in various embodiments using computationally efficient methods. It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 8 is a table describing various non-limiting advantages of the novel layer-based detection technology disclosed herein.

DESCRIPTION

The detection technology described herein can efficiently and effectively detect and recognize unique objects such as people and non-people from depth images. In some embodiments, the technology can recognize objects (e.g., people) in depth images even when important aspects of those objects (e.g., a person's head or shoulders) are occluded. In essence, an occlusion means that a part of an object (e.g., a portion of a person's body) in a scene being recorded is blocked from view (e.g., from the camera's perspective). Occlusions may be caused by a number of variables. For instance, occlusions may be caused by, but are not limited to: 1) physical objects in frame that block part of the person from view; 2) the edge of the camera image plane; and 3) other artifacts that may block or obscure objects in images from being visible, such as lighting, focus, noise, etc., during capture, etc.

In a non-limiting example, the detection technology includes computer-implemented algorithms that recognize objects in depth images by comparing object segments (also called layers) to reference surfaces (e.g., a convex parabola and a line). The detection technology may require a minimum of parameters be estimated for each 2D segment of the object, from which a classifier can be rapidly trained to separate people from objects. Combining the 2D scans can then result in >90% recognition precision.

The detection technology is applicable in numerous areas, including in exploring people detection in real environments, extending recognition to people carrying objects, and working in non-upright poses including people lying down or bent over. In general, is to make detection work in every environment that a person might want to interact with an intelligent computing device.

Figure 1:
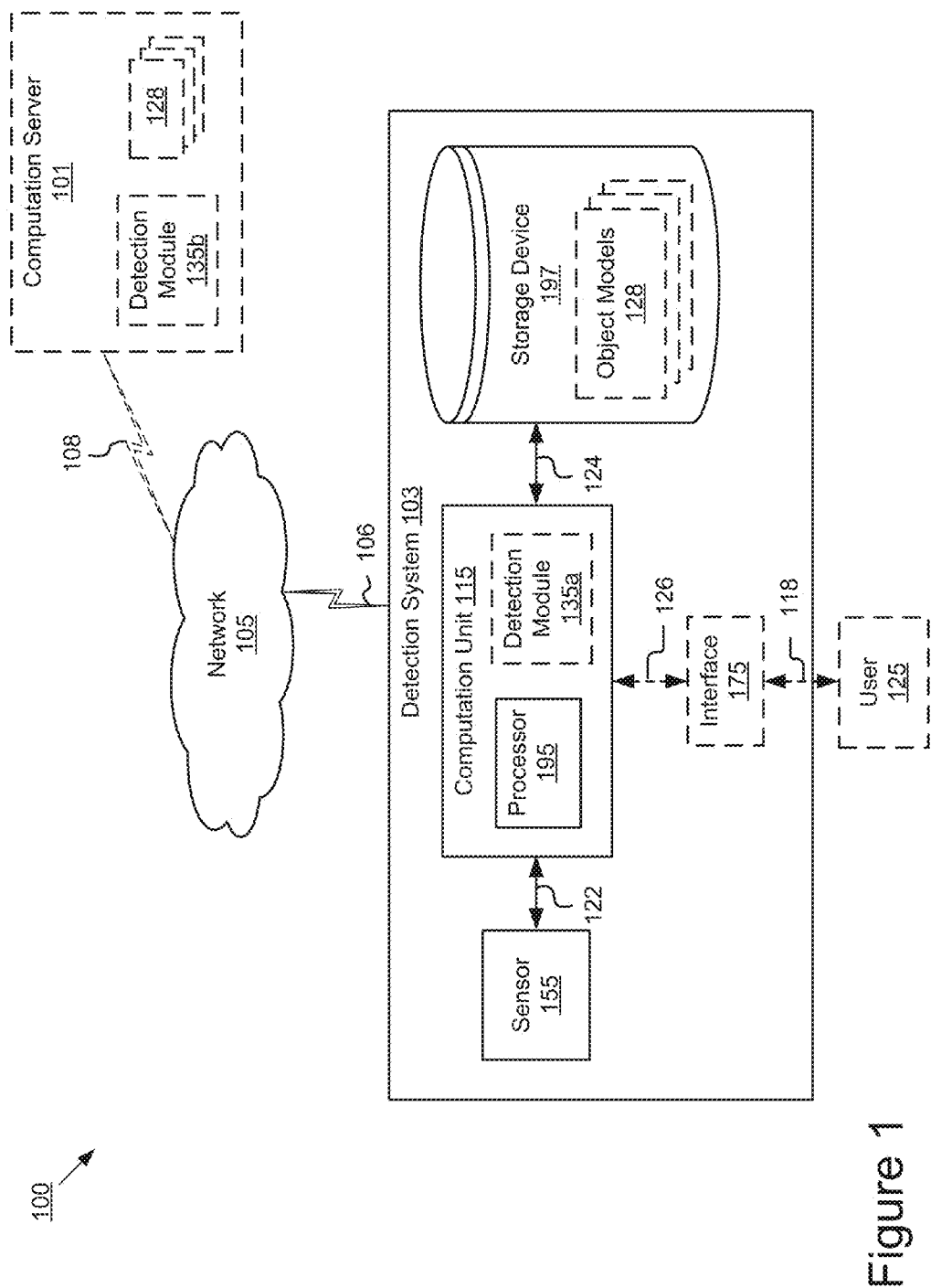
FIG. 1 is a block diagram of an example system for recognizing image objects.

FIG. 1 is a block diagram of an example system 100 for recognizing objects. As illustrated, the system 100 may include a computation server 101 and/or a detection system 103 that may be accessed and/or interacted with by a user 125 (as depicted by signal line 118). Depending on the implementation, the system may or may not include a computation server 101. In embodiments where a computation server 101 is included, the detection system 103 and the computation server 101 may be communicatively coupled via a network 105 via signal lines 106 and 108, respectively. For example, the detection system 103 and the computation server 101 may be communicatively coupled to each other via the network 105 to exchange data, such as sensor data, recognition data, etc. The signal lines 106 and 108 in FIG. 1 may be representative of one or more wired and/or wireless connections. As a further example, the detection system 103 may transmit sensor data to the computation server 101 for processing and the computation server 101 may process the data as described herein to detect and recognize objects and send data and/or results describing the recognized objects to the detection system 103 for use thereby during operation. In embodiments where a computation server 101 is not included, the detection system 103 may operate autonomously or in conjunction with other detection systems 103 (not visible) to detect and recognize objects. For instance, a detection system 103 may be networked via a computer network with other similar detection systems 103 to perform the computations discussed herein.

While FIG. 1 depicts a single detection system 103 and computation server 101, it should be understood that a variety of different system environments and configurations are possible, contemplated, and within the scope of the present disclosure. For instance, some embodiments may include additional or fewer computing devices, services, and/or networks, and may implement various functionality locally or remotely on other computing devices. Further, various entities may be integrated into to a single computing device or system or distributed across additional computing devices or systems, etc. For example, the detection module 135 may be stored in, executable by, and distributed across a combination of computing devices and/or systems or in one computing device and/or system.

The network 105 may include a conventional type network, wired or wireless, and may have any number of configurations, such as a star configuration, token ring configuration, or other known configurations. The network 105 may include one or more local area networks ("LANs"), wide area networks ("WANs") (e.g., the Internet), virtual private networks ("VPNs"), peer-to-peer networks, near-field networks (e.g., Bluetooth™), cellular networks (e.g., 3G, 4G, other generations), and/or any other interconnected data path across which multiple computing nodes may communicate. Data may be transmitted in encrypted or unencrypted form between the nodes of the network 105 using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

The detection system 103 may be representative of or included in an autonomous computing system capable of perceiving, recognizing, and interpreting the significance of objects within its environment to perform an action. For example, the detection system 103 may be representative of or incorporated into an intelligent car having the capability of recognizing a particular driver or passenger inside the car. In further examples, the detection system 103 may be representative of or incorporated into a social robot that can cooperate with humans and/or other robots to perform various tasks, or an autonomous system operating in populated environments. In some embodiments, the detection system 103 may be incorporated in other systems as a component for detecting and recognizing objects. For instance, the detection system 103 may be incorporated into a client device such as a gaming system, television, mobile phone, tablet, laptop, workstation, server, etc. For example, the detection system 103 may be embedded in a machine or computer system for determining if a certain person or persons are present at a particular location and the machine or computer system can turn on/off or execute a particular program if that certain person or persons are present at the particular location.

In some embodiments, the detection system 103 may include a sensor 155, a computation unit 115 that includes a processor 195 and an instance 135a of the detection module, a storage device 197 storing a set of object models 128, and/or an interface 175. As depicted, the sensor 155 is communicatively coupled to the computation unit 115 via signal line 122. The storage device 197 is communicatively coupled to the computation unit 115 via signal line 124. The interface 175 is communicatively coupled to the computation unit 115 via signal line 126. In some embodiments, an instance 135b of the detection module, or various components thereof, can be stored on and executable by the computation server 101, as described elsewhere herein. The instances of the detection module 135a and 135b are also referred to herein individually and/or collectively as the detection module 135.

Although single instances of each of the computation unit 115, sensor 155, storage device 197 and interface 175 are depicted in FIG. 1, it should be recognized that the detection system 103 can include any number of computation units 115, sensors 155, storage devices 197 and/or interfaces 175. Furthermore, it should be appreciated that depending on the configuration the detection system 103 may include other elements not shown in FIG. 1, such as an operating system, programs, various additional sensors, motors, movement assemblies, input/output devices like a speaker, a display device, a transceiver unit and an antenna for wireless communication with other with other devices (e.g., the computation server 101, other detection systems 103 (not shown), any other appropriate systems (not shown) communicatively coupled to the network 105, etc.

The sensor 155 may include one or more sensors configured to capture light and other signals from the surrounding environment and to generate and/or processes sensor data, such as depth data, therefrom. For instance the sensor 155 may include a range camera, such as but not limited to an RGB-D camera, a stereo camera, a structured light camera/scanner, time-of-flight camera, interferometer, modulation imager, a laser rangefinder, a light-field camera, an intensified CCD camera, etc., although it should be understood that other types of sensors may be used, such as but not limited to an ultrasound sensor, a color camera, an infrared camera, etc. In some embodiments, the sensor 155 and/or detection system 103 may include a combination of different types of sensors, such as accelerometers, gyroscopes, thermometers, barometers, thermocouples, or other conventional sensing devices. Swiss Ranger sensor by MESA Imaging, Kinect sensor by Microsoft, various stereo vision systems, etc., are further non-limiting examples of cameras that the sensor 155 may include. The sensor 155 may be incorporated into the computation unit 115 or may be a disparate device that is coupled thereto via a wireless or wired connection.

In various embodiments, the sensor 155 may generate and send the depth data describing distance information associated with objects captured by the sensor 155 to the computation unit 115 and/or the computation server 101 for processing, as described elsewhere herein.

Figure 2A:
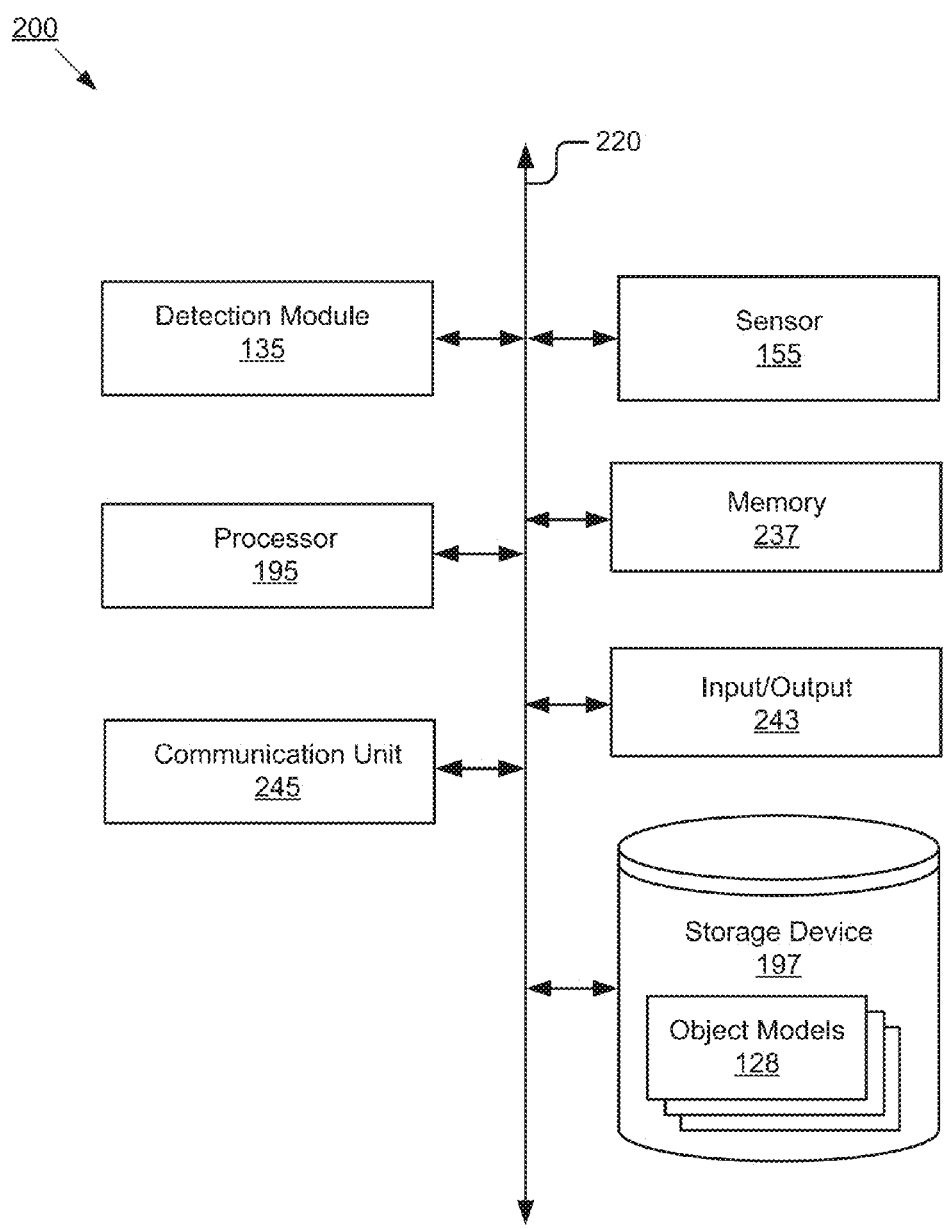
FIG. 2A is a block diagram of an example computing device.

The computation unit 115 may include any processor-based computing device, such as the computing device 200 depicted in FIG. 2A. In an embodiment, the computation unit 115 may receive sensor data from the sensor 155, process the sensor data, generate and/or provide results for presentation via the interface 174 based on the processing, trigger various programs based on the processing, control the behavior and/or movement of the detection system 103 or associated systems based on the processing, cooperate with the computation server 101 to process the sensor data, etc., as described elsewhere herein. In some embodiments, the computation unit 115 may store the processed sensor data and/or any results processed therefrom in the storage device 197. The processor 195 and the detection module 135 are described in detail with reference to at least FIGS. 2A-12C.

The interface 175 is a device configured to handle communications between the user 125 and the computation unit 115. For example, the interface 175 includes one or more of a screen for displaying detection information to the user 125; a speaker for outputting sound information to the user 125; a microphone for capturing sound and/or voice commands; and any other input/output components facilitating the communications with the user 125. In some embodiments, the interface 175 is configured to transmit an output from the computation unit 115 to the user 125. For example, the interface 175 includes an audio system for playing a voice greeting to the user 125 responsive to the computation unit 115 detecting that the user 125 is within the vicinity. It should be understood that the interface 175 may include other types of devices for providing the functionality described herein.

The user 125 may be a human user. In one embodiment, the user 125 is driver or a passenger sitting in a vehicle on a road. In another embodiment, the user 125 is a human that interacts with a robot. In a further embodiment, the user is a conventional user of a computing device. The user 125 may interact with, or otherwise provide inputs to and/or receives outputs from, the interface 175 which sends and receives different types of data to and from the computation unit 115.

The storage device 197 includes a non-transitory storage medium that stores data. For example, the storage device 197 includes one or more of a dynamic random access memory (DRAM) device, a static random access memory (SRAM) device, flash memory, a hard disk drive, a floppy disk drive, a disk-based memory device (e.g., CD, DVD, Blue-ray™, etc.), a flash memory device, or some other known non-volatile storage device. The storage device 197 may be included in the detection system 197 or in another computing device and/or storage system distinct from but coupled to or accessible by the detection system 197. In some embodiments, the storage device 197 may store data in association with a database management system (DBMS) operable by the detection system 103 and/or the computation server 101. For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

The computation server 101 is any computing device having a processor (not pictured) and a computer-readable storage medium (e.g., a memory) (not pictured) to facilitate the detection system 103 to detect and recognize objects. In some embodiments, the computation server 101 includes an instance 135b of the detection module. In network-based embodiments, the computation server 101 receives sensor data (e.g., depth data) from the detection system 103, processes the sensor data, and sends any result of processing to the detection system 103.

FIG. 2 is a block diagram of a computing device 200 that includes a detection module 135, a processor 195, a memory 237, a communication unit 245, a sensor 155, and a storage device 197 according to the illustrated embodiment. The components of the computing device 200 are communicatively coupled by a bus 220. In some embodiments, the computing device 200 is representative of the architecture of a detection system 103 and/or a computation server 101.

The memory 237 may store and provide access to data to the other components of the computing device 200. In some implementations, the memory 237 may store instructions and/or data that may be executed by the processor 195. For instance, the memory 237 may store the detection module 135 and/or components thereof. The memory 237 is also capable of storing other instructions and data, including, for example, an operating system, hardware drivers, other software applications, databases, etc. The memory 237 may be coupled to the bus 220 for communication with the processor 195 and the other components of the computing device 200.

The memory 237 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor 195. In some implementations, the memory 237 may include one or more of volatile memory and non-volatile memory. For example, the memory 237 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 237 may be a single device or may include multiple types of devices and configurations.

The communication unit 245 transmits data to and receives data from other computing devices to which it is communicatively coupled using wireless and/or wired connections. The communication unit 245 may include one or more wired interfaces and/or wireless transceivers for sending and receiving data. The communication unit 245 may couple to the network 105 and communicate with other computing nodes, such as the detection system 103 and/or the computation server 101 (depending on the configuration). The communication unit 245 may exchange data with other computing nodes using standard communication methods, such as those discussed above regarding the network 105.

The detection module 135 may be coupled to the sensor 155 to receive sensor data. In some embodiments, the sensor data received from the sensor 155 may include depth data describing a depth image. The depth image may be an image depicting a scene including one or more objects. An object may be a living or a non-living object, an animate or inanimate object, etc. Example objects include but are not limited humans, animals, furniture, fixtures, cars, utensils, etc. The detection module 135 can efficiently recognize objects by extracting blobs associated with the objects, segmenting the blobs into layers, and classifying the objects associated with the blobs using the layers. In various embodiments, the detection module 135 may be executable to extract one or more blobs representing one or more objects from the depth data, classify the blobs as describing people or non-people objects, segment the blobs into layers, compare the layers of each blob to a set of object models to determine the identity of the object associated with the blob (e.g., recognize the specific individual associated with a person blob), etc.

Figure 2B:
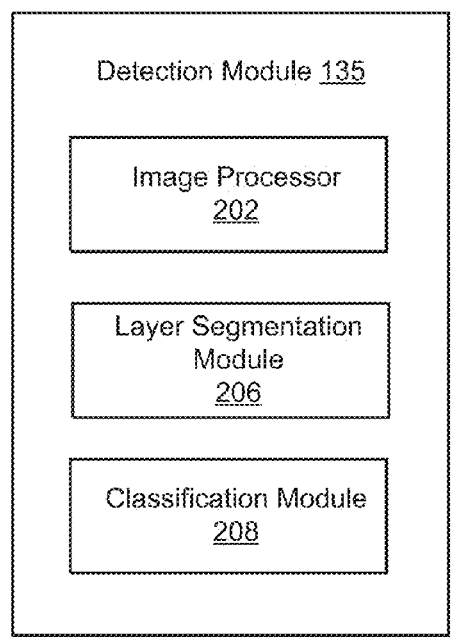
FIG. 2B is a block diagram of an example detection module.

As shown in FIG. 2B, which depicts an example detection module 136, the detection module 136 may include an image processor 202, a layer segmentation module 204, and a classification module 206, although it should be understood that the detection module 136 may include additional components such as a registration module, a training module, etc., and/or that various components may be combined into a single module or divided into additional modules.

The image processor 202, the layer segmentation module 204, and/or the classification module 206 may be implemented as software, hardware, or a combination of the foregoing. In some implementations, the image processor 202, the layer segmentation module 204, and/or the classification module 206 may be communicatively coupled by the bus 220 and/or the processor 195 to one another and/or the other components of the computing device 200. In some implementations, one or more of the components 135, 202, 204, and/or 206 are sets of instructions executable by the processor 195 to provide their functionality. In further implementations, one or more of the components 135, 202, 204, and/or 206 are stored in the memory 237 and are accessible and executable by the processor 195 to provide their functionality. In any of the foregoing implementations, these components 135, 202, 204, and/or 206 may be adapted for cooperation and communication with the processor 195 and other components of the computing device 200.

The image processor 202 may be communicatively coupled to the sensor 155 to receive sensor data and may process the sensor data to extract blobs of objects depicted by the image. In some embodiments, the sensor data may include depth image data describing the position of the objects relative to a point of reference. For example, the sensor 155 may include a multi-dimensional depth sensor that generates multi-dimensional (e.g., 3D) data describing a depth image including object(s) captured by the sensor 155. The depth image data may include RGB values for the pixels forming the object(s) in the image. In some cases, the depth image data may include positional information associated with the object(s), such as a multi-dimensional (e.g., 3D) depth point cloud in form of an array of triplets or spatial coordinates. In some cases, the depth image data may include the column and row number of each pixel represent its X and Y coordinates and the value of the pixel represents its Z coordinate.

The image processor 202 may use the depth image data describing the depth images captured by the sensor 155 to determine the discrete object(s) included in the depth images. Using depth imaging can provide various advantages including simplifying object segmentation. In depth images, objects can often be separated from each other in the image by their relative depth. For instance, two adjacent pixels having the same relative distance (as measured from a given point of reference such as the sensor 155 location) are likely to belong to the same object, but two pixels having significantly different distances relative to the point of reference likely belong to different objects in the image. This can be helpful to more easily distinguish freestanding objects from one another.

Figure 6:
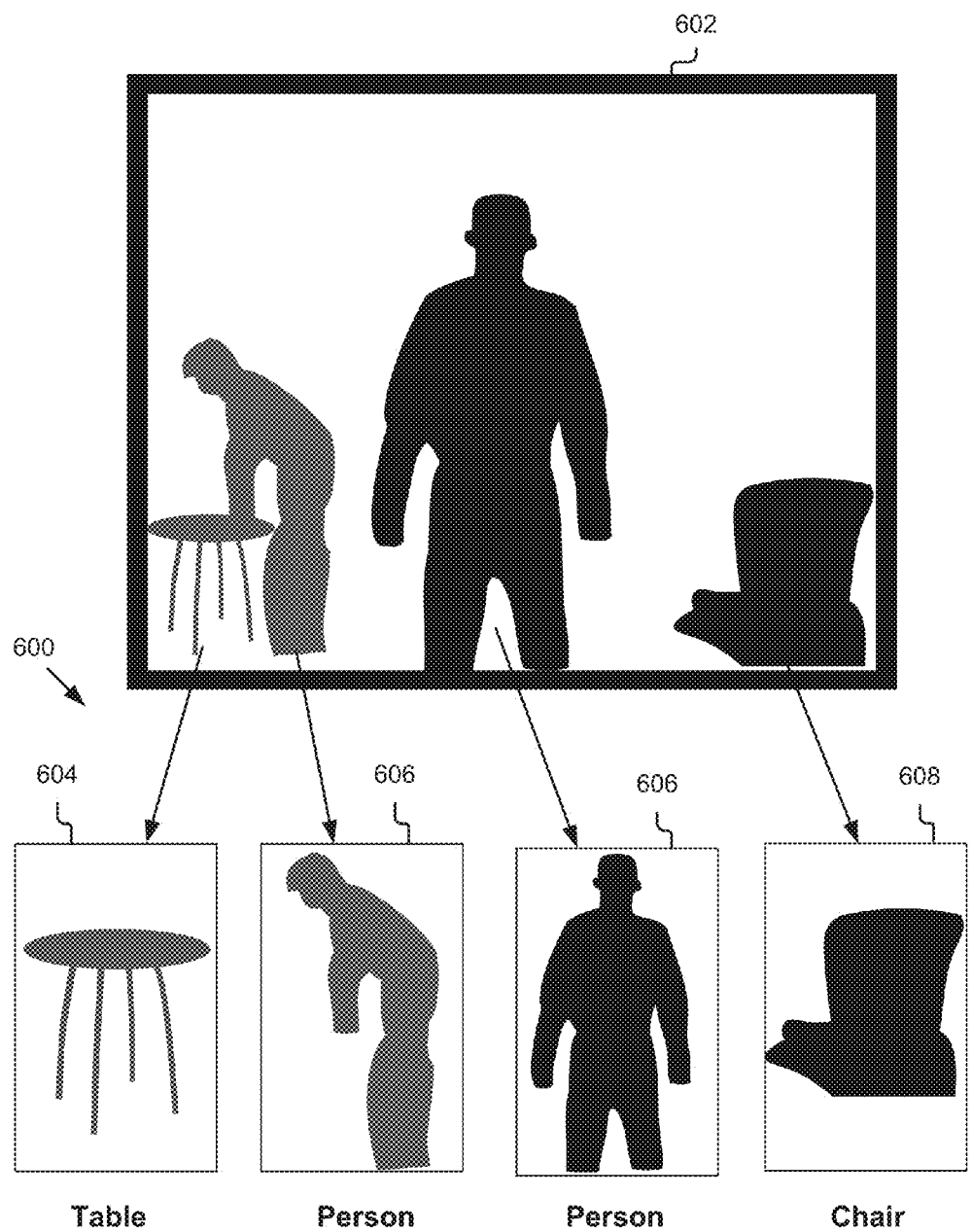
FIG. 6 depicts example blobs extracted from an example depth image.

FIG. 6 demonstrates example object blobs 600 extracted from an example depth image 602. In particular, the depth image 602 depicts a man in a central portion of the frame with another person leaning over a table on the left of the frame and a chair on the right portion of the frame. The image processor 202 processes the data describing the depth image to extract blobs representing the objects, such as blob 604 representing the table, blob 606 representing the person leaning on the table, the blob 606 representing the person in center frame, and blob 608 representing the chair.

In some embodiments, to extract blobs from a depth image, the image processor 202 may estimate positional data for the pixels in the depth image using the distance data associated with those pixels and may apply a flood fill algorithm to adjacent/connected pixels with corresponding depths to determine blobs for the object(s) formed by the pixels. In some embodiments, the image processor 202 may filter out any pixels in the depth image that do not have any distance data associated with them prior to estimating the position data to reduce the amount of processing that is required. Additionally or alternatively, after determining the blobs, the image processor 202 may filter out blobs that are smaller than a certain size (e.g., 500 pixels) to eliminating processing of blobs that are likely to be inconsequential.

In some further blob extraction embodiments, using the focal length of the camera (e.g., sensor 155) and the depth image, the image processor 202 may extract Z, X, and Y coordinates (e.g., measured in feet, meters, etc.). The image processor 202 may then filter the depth image. In particular, the image processor 202 may remove all pixels that have depth that do not fall within a certain rage (e.g., 0.5-6.0 meters). Assuming a point of reference (e.g., a planar surface on which the camera is mounted that is parallel to the floor), the image processor 202 may estimate the X and Y coordinates of each pixel using the following formula:

$$x(\text{row}, col) = \frac{(col_{center} - col) * Z(\text{row}, col)}{\text{focal\_length}}$$

$$y(\text{row}, col) = \frac{(\text{row}_{center} - \text{row}) * Z(\text{row}, col)}{\text{focal\_length}},$$

where focal length is the camera focal length. The image processor 202 may then remove certain pixels based on their X, Y location.

The image processor 202 may then apply a flood fill algorithm to the pixels of the depth image connected together within a certain depth threshold (e.g., 5 cm) to produce blobs describing one or more object(s) in the depth image. The image processor 202 can remove blobs that are smaller than a certain size (e.g., 500 pixels). The remaining blobs may then be analyzed (e.g., classified, segmented into layers, and matched to objects models), as discussed in further detail herein.

In some embodiments, the image processor 202 may pre-classify the blobs based on their shape to reduce the number of blobs that ultimately need to be segmented and classified. This can reduce processing time when certain types of blobs may not need to be processed. For instance, in some cases only people blobs may need to be recognized by the detection module 135, and the image processor 202 may discard any blobs associated with non-people objects. The image processor 202 may pre-classify objects based on the overall shapes of their blobs. For instance, people blobs generally have certain unique human characteristics that distinguish them from non-person blobs, such as a head and shoulder regions, leg regions, arm regions, torso regions, etc. The image processor 202 may analyze the blobs to determine whether their outlines/shapes include one or more of these human characteristics, and if so, may classify them as person object types.

The layer segmentation module 204 may be coupled to the image processor 202, the memory 237, the communication unit 245, or another component to receive data describing one or more blobs detected from the sensor data, may segment each blob into a set of layers, and may calculate one or more properties associated with each layer. A particular object, such as a certain person, can be uniquely described by the collection of the layers (e.g., horizontal slices). The segmentation performed by the layer segmentation module 204 is also referred to herein in various places as slicing or transforming. The set of layers may be a series of contiguous segments extending from one side of the blob to another. The set of layers may represent a sampling of various portions of the blob. This provides the benefit of maintaining a highly accurate recognition rate while increasing computational efficiency by not processing the entire blob. In some embodiments, the segments are substantially parallel and have a predetermined thickness. The spacing between segments may be uniform, non-uniform, or random in nature depending on the embodiment. In some embodiments, the layers may be horizontal layers. In other embodiments, the layers may be vertical or diagonal layers. Also, while the layers are depicted as being substantially flat, it should be understood that layers that are non-flat may also be used.

Figure 7:
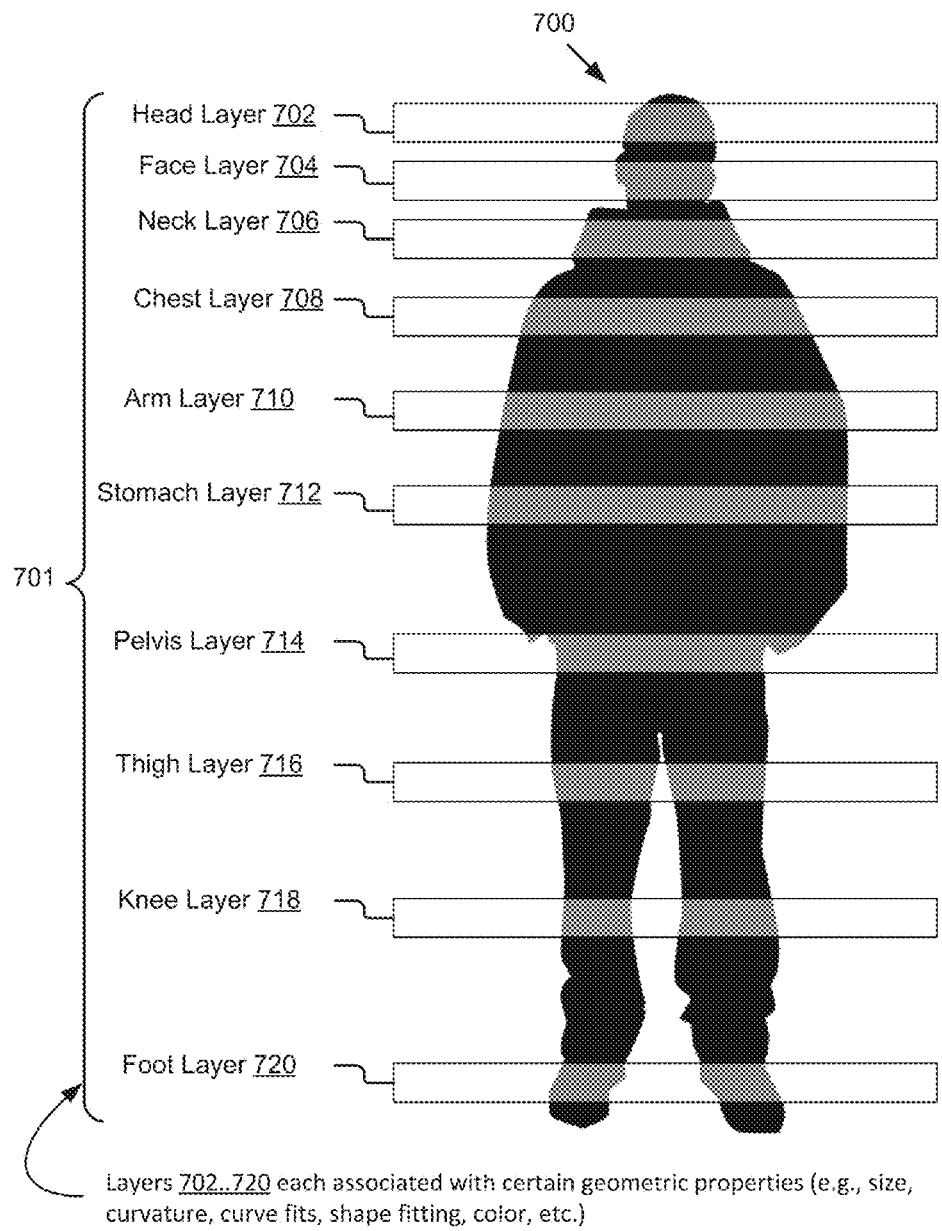
FIG. 7 is a diagram showing an example segmentation of a person blob into a plurality of layers.

As a further example, for a person blob, the layer segmentation module 204 may segment the blob in locations estimated to be most relevant. For instance, a person blob may be segmented in locations corresponding to various notable body parts, as shown in FIG. 7 and described in further detail below. The layer segmentation module 204 may in some cases filter-out layers having a length that does not meet a certain minimum length (e.g., five pixels in length) and may process each of the remaining layers/segments to determine geometric properties for that layer. In some embodiments, the layer segmentation module 204 may base the segmentation scheme applied on the object type pre-classified by the image processor 202. The object type may be received from the image processor 202, the memory 237, the communication unit 245, or another component.

FIG. 7 is a diagram showing an example segmentation of a person blob 700 into a plurality of layers 701. In some embodiments, the layer segmentation module 204 may segment the person blob 700 in regions that correspond to notable body parts. For instance, the set of layers 701 determined by the layer segmentation module 204 may include one or more of a head layer 702, a face layer 704, a neck layer 706, a chest layer 708, an arm layer 710, a stomach layer 712, a pelvis layer 714, a thigh layer 716, a knee layer 718, and a foot layer 720. For each of the layers 702 . . . 720, the layer segmentation module 204 may determine one or more properties. In some embodiments, a property may describe the size, curvature, a curve fit, a shape fit, etc., associated with the layer, as described elsewhere herein.

The artificial environments that people live in, whether inside or outside in the city, include many more surfaces that are flat or at least much less curved than people. People by contrast, are generally curved all over. For instance, people's heads, arms, legs, chest, etc., generally all have some curvature to them. As a result, even if only part of a person is visible, that part is likely to have some curvature. Accordingly, the segmentation module 204 can process the layers segmented by it from a given blob to determine their unique curvature properties, which are then used by the classification module 206 to identify the blob. As few as six properties in some cases may accurately characterize curvature associated with a blob at close range.

Figure 9:
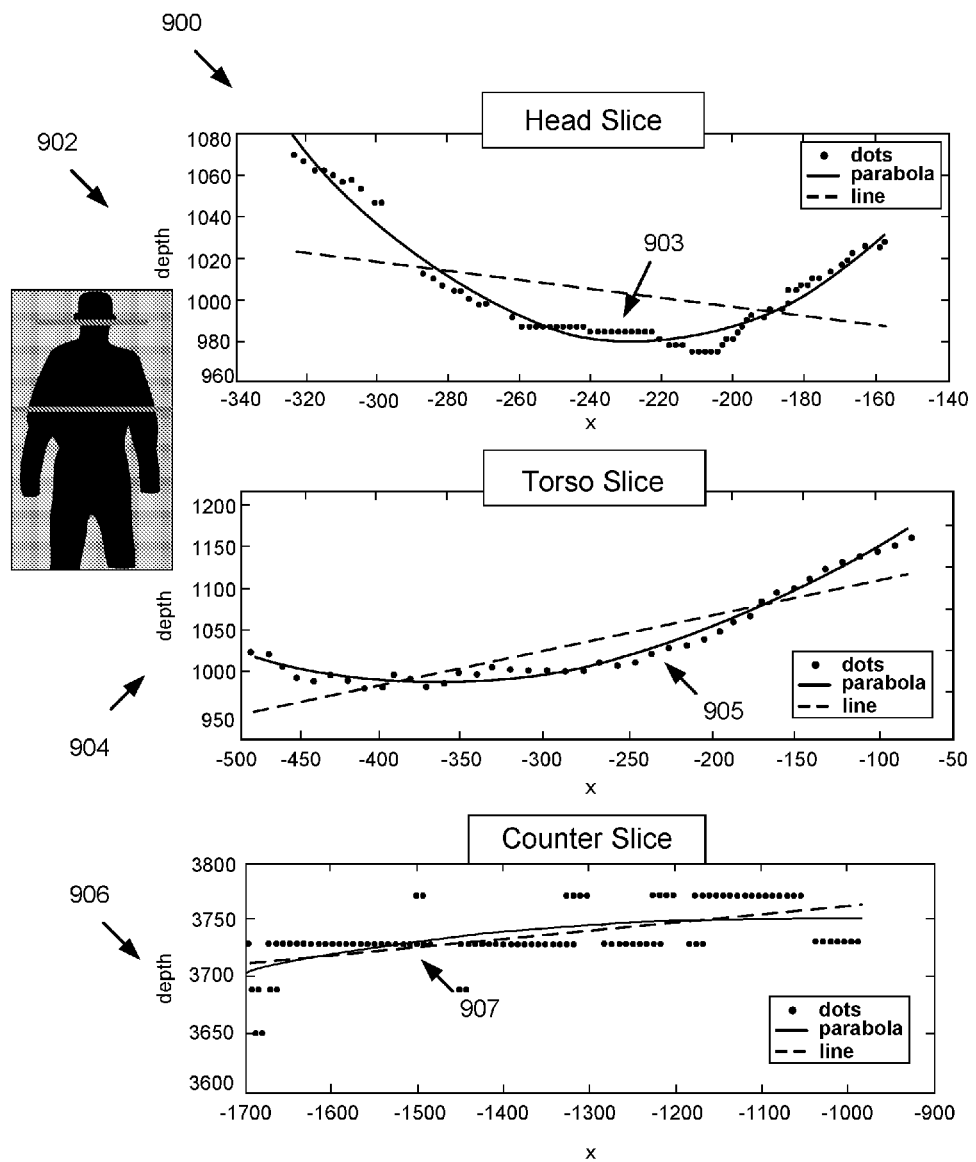
FIG. 9 depicts example layers extracted from an upright person blob processed from a depth image.

In some embodiments, the layer segmentation module 204 may determine layer curvature by fitting a line and a parabola to the data points associated with the layer in the X and Z dimensions. FIG. 9 depicts example layers extracted from an upright person blob 902 processed from a depth image. As shown, the parabolas 903 and 905 in the head slice graph 900 and the torso slice graph 904, respectively, show significant curvature. Unlike the head slide graph 900 and the torso slice graph 904, the counter slice graph 906, which is based on a layer taken from a blob associated with a counter (not portrayed), includes a parabola 907 that is substantially flat in nature and fits closer to the line. In some implementations, the layer segmentation module 204 may use a polyfit algorithm extended to double floating-point precision to find the best line (L) and parabola (P) equations describing the data, although other suitable polynomial fitting algorithms may also be used.

The layer segmentation module 206 may then use the L and P equations associated with each layer may to determine a set of geometric properties associated with that layer. In some embodiments, the set of geometric properties may be represented as a six dimensional vector including the following elements:
1. $\Delta c$, which is the line depth at the center of the segment minus the center parabola depth as a measure of concavity $L(x_\mu)-P(x_\mu)$;
2. $RMSE_L$, which is the root mean squared error of the fitted line equation;
3. $\sigma_L$, which is the standard deviation of the fitted line equation;
4. $RMSE_P$, which is the root mean squared error of the fitted parabola equation;
5. $\sigma_P$, which is the standard deviation of the fitted parabola equation; and
6. k, which is an estimation of curvature.

The classification module 206 may uniquely identify the objects in the depth image based on the set of layers. In some embodiments, the classification module 206 may compare the layers associated with each object to a set of stored object models to determine a match. For instance, to determine a matching object model, the classification module 206 may compare the geometric properties of the layers to each of the models. As a further example, using one or more curvatures associated with one or more horizontal slices of a blob, the classification module 206 can determine which person or other object the blob corresponds to. Example types of models compiled from previous information include, but are not limited to, image galleries, Gaussian mixture models, hidden Markov models, and support vector machines.

In some embodiments, the classification module 206 may calculate, for each object model 128 stored in the storage device 197, a combined value representing the output of all the layers of the set, which represents the likelihood of the detected person belonging to that object model. The combined value may represent a recognition score used for identifying a particular individual or object.

The classification module 206 may be coupled to the layer segmentation module 204, the memory 237, the communication unit 245, and/or another component to receive the set(s) of segmented layers associated with a given depth image and the geometric properties associated with each of the layers. The classification module 206 may be coupled to the storage device 197 to retrieve the object models 128. The object models 128 may represent objects that have been trained, registered, and/or otherwise pre-determined, and are detectable and recognizable by the detection module 135. The object models may be manually input, for instance, by an applicable stakeholder such as the user, an administrator, etc., and/or may be machine learned using various machine learning technique, such as a probabilistic graphical model (e.g., a Gaussian mixture model). In some embodiments, Gaussian mixture models (GMM) with a various numbers of mixtures (e.g., 50+) can be trained using manually classified objects from various depth images.

In some instances, the detection module 135 may include a registration module and/or training module (not shown) for registering and/or training new objects with the detection module 135. During registration, the registration module may capture one or more depth images of the object and the training module may generate or update an object model that describes the various properties of the object including, for instance, the curvature of the object. A user registering the object may optimize the object model by entering and/or adjusting automatically determined information (e.g., curvature information) about the object via an associated user interface, such as entering a unique name for the object (e.g., a person's name), categorizing the object, entering attributes about the object (e.g., size, weight, color, etc.). In some instances, the object models may be updated regularly with the most current, reliable models. For instance, the detection systems 103 and/or users may upload new object models to the computation server and the computation server may push the models to the various other detection systems 103 that are coupled to the network 105 for use by the detection systems 103.

In an embodiment that utilizes Gaussian mixture models to classify a given blob, the classification module 206 may determine the likelihood of a vector belonging to a predetermined Gaussian mixture person model, M, using the equation:

$$p(\vec{x}, M) = \sum_{i=1}^{50} \frac{P_i}{\sqrt{(2\pi)^6|\sigma_i|}} e^{-(\vec{x}-\vec{\mu})^T \sigma_i^{-1}(\vec{x}-\vec{\mu})}, \text{ where } [\sigma_i, P_i, \vec{\mu}_i] \in M_i$$

The log-likelihood of a new segment, v, belonging to a given object model, OM, may be determined by the following equation:

$$O(\vec{v}) = \log(p(\vec{v}, OM)) - \log(p(\vec{v}, \text{not\_OM})),$$

where the object model, OM, may represent one or more generic or specific people.

Given N segments in an object sequence, S, each with its own likelihood, the classification module 206 may classify the blob/object by summing up the log likelihoods and applying a predetermined threshold. A maximum cumulative score can be a reliable indicator of whether or not the set of layers/sequences correspond to a given object model or not. For instance, if the score satisfies (e.g., is greater than) a predetermined threshold that has been verified as an effective minimum likelihood that the object matches the model, then the object can be classified as corresponding to the person. This helps in the case where incorrectly classified segments might cluster together to negatively affect proper classification. For instance, a person blob may include layers associated with an arm held out parallel to the ground, a dress, and/or an object being, etc., that can cluster together negatively to bring down the likelihood score that the object is associated with a particular object model to which it in fact corresponds. In some cases, if a given blob terminates after such a negative cluster of layers, the object could potentially be incorrectly classified by the classification module 206, in which case, the classification module 206 may consider the cumulative sum of the log likelihood score.

One significant advantage of the novel layer-based approach discussed herein is that it is tolerant to occlusions. For instance, even if only a portion of the object is visible in the depth image and, as a result, some layers could not be extracted from the blob (e.g., from the top, bottom, right, left, and/or the middle of the object) and are therefore missing, the object (e.g., person) can in many cases still be recognized by the classification module 206 because the object is modeled in its corresponding object model as a collection/set of layers. For instance, for person recognition, the eyes, nose, or top of head, which are commonly required by other face and head recognition approaches to align the image with the model, do not have to be visible in the depth image for the classification module 206 to accurately recognize the person. Additional advantages of the layer-based recognition approach described herein relative to other approaches are summarized in the table 800 in FIG. 8.

Figure 3:
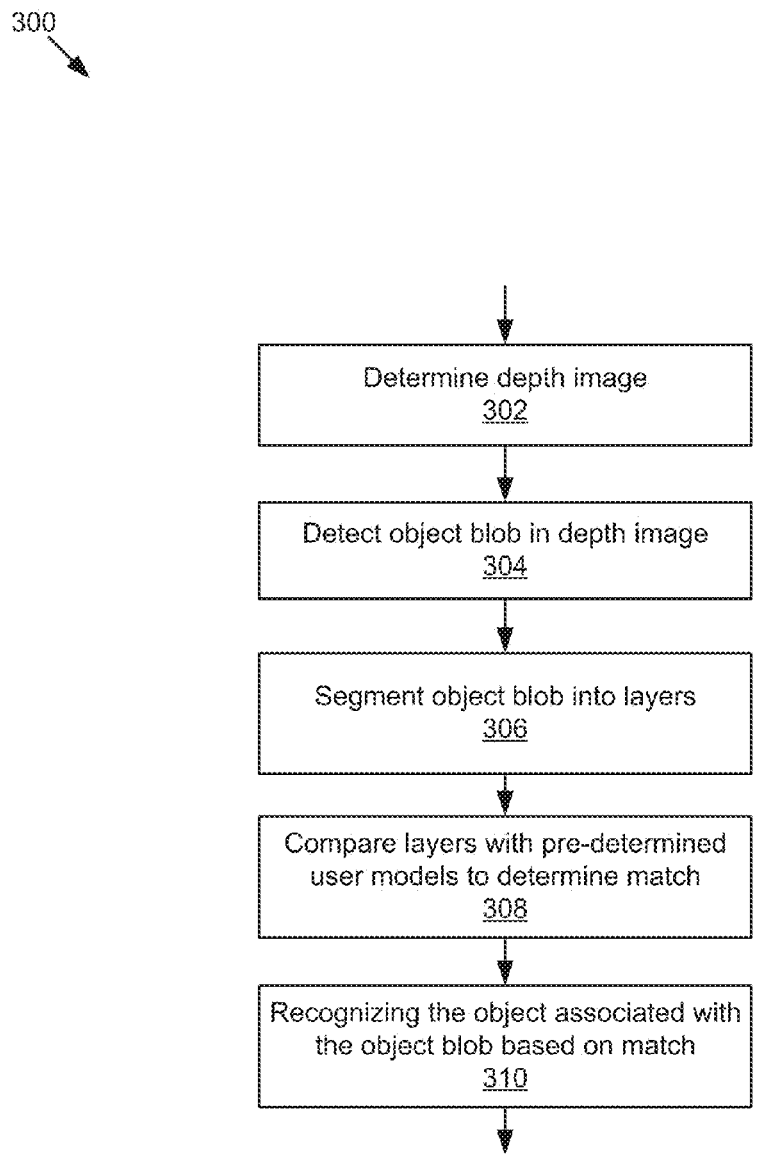
FIG. 3 is a flowchart of an example method for recognizing image objects.

FIG. 3 is a flowchart of an example method 300 for detecting and recognizing image objects. In block 302, the image processor 202 may determine a depth image. In some embodiments, the image processor 202 may determine a depth image by receiving the depth image from the sensor 155 (e.g., a stereo camera, a structured light camera, a time-of-flight camera, etc.). In block 304 the image processor 202 may detect an object blob in the depth image, in block 306 the layer segmentation module 204 may segment the object blog into a set of layers, and in block 308 the classification module 206 may compare the set of layers associated with the object blob with a set of object models to determine a match.

In some embodiments, in association with determining the set of layers, the layer segmentation module 204 may determine a curvature associated with the set of layers and the classification module 206 may evaluate the curvature using the object models when comparing the set of layers with the object models to determine the match. Further, in some embodiments, the classification module 206 may compare the set of layers with the set of object models by determining a likelihood of the object blob as belonging to each of the object models and determining the object blob to match a particular object model based on the likelihood.

Next, in block 310, the classification module 206 may recognize the object associated with the object blob based on the match. For instance, the classification module 206 may determine the identity of the object (e.g., by receiving from the storage device 197 identifying information for the object that is stored in association with the matching object model 128). In response to identifying the object, the detection module 135 may trigger the operation of a program that performs operations based on the identity of the object, such as retrieval of information associated with the object, control of one or more output devices (e.g., displays, speakers, sensors, motivators, etc.) to interact with the object (e.g., greeting a user using the user's name), pulling up account information associated with the object (e.g., a specific person/user), etc.

Figure 4A:
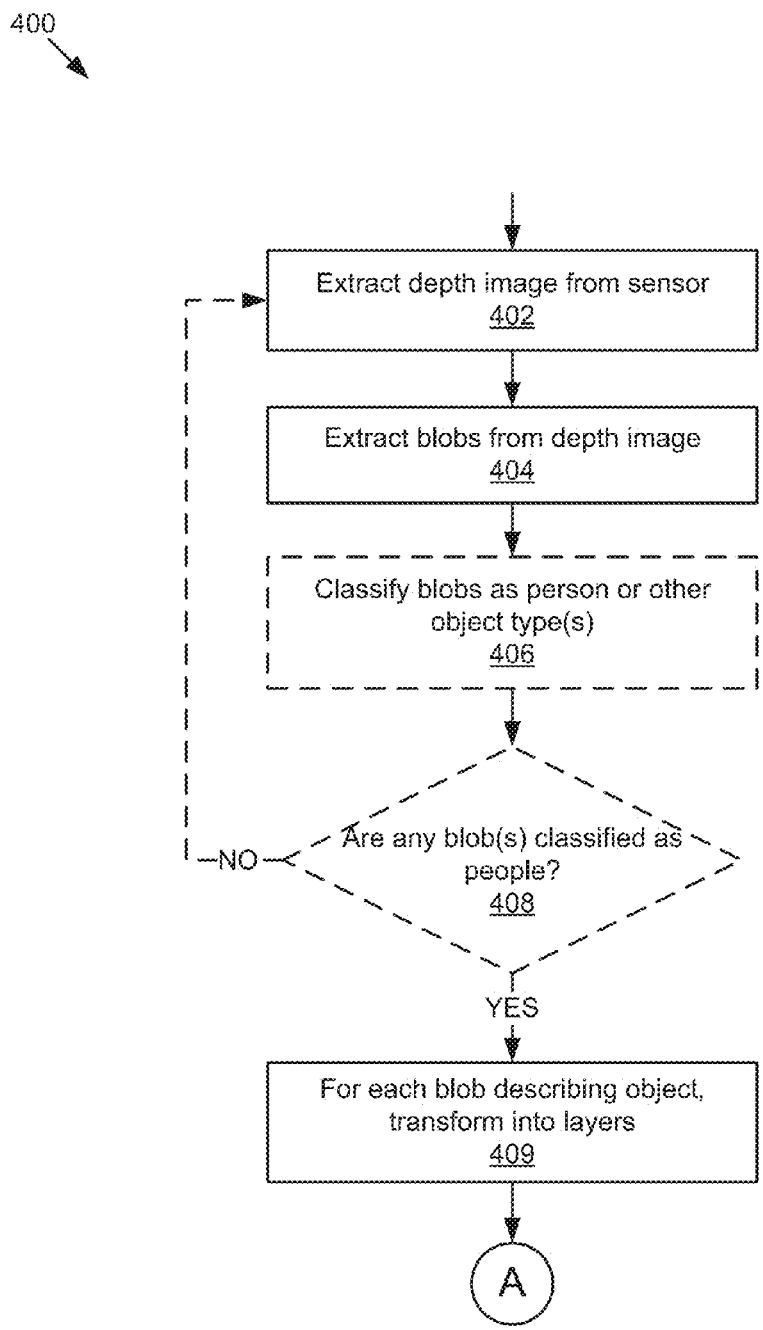
FIGS. 4A and 4B are flowcharts of a further example method for recognizing image objects.
Figure 4B:
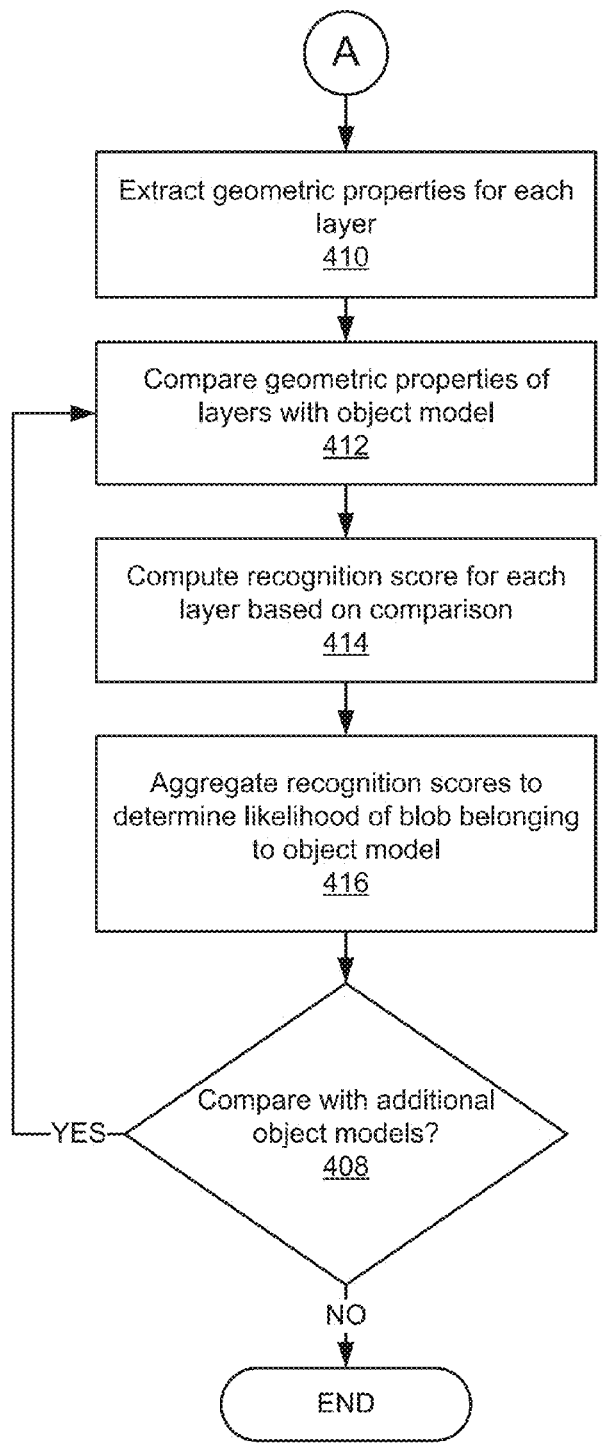

FIGS. 4A and 4B are flowcharts of a further example method 400 for detecting and recognizing image objects. In block 502, the image processor 202 extracts a depth image from the sensor 155 and then extracts one or more blobs from the depth image in block 404. In some instances, the image processor 202 may classify the extracted blobs as a human/person or other object types (e.g., animal, furniture, vehicle, etc.). For instance, the image processor 202 may detect a plurality of blobs associated with a plurality of objects depicted by the depth image, and may classify each of those blobs as a person or other type of object based on a shape of the blob as shown in block 406. In some embodiments, if a given blob is not classified into a type that meets one or more a blob type requirements, the image processor 202 may discard that blog from further processing (e.g., layer extraction, blob recognition, etc.). For instance, as shown in block 408, if none of the blobs reflect people, the method may return to the beginning and repeat until a person blob is found. In other embodiments, the method 400 may skip the classification and filtering operations in blocks 406 and 408.

Next, in block 409, for each blob provided by the image processor 202, the layer segmentation module 206 may transform the blob into a set of layers and extract one or more geometric properties for each layer of the set. Then, in block 412, the classification module 206 may compare the one or more geometric properties associated with each layer of the set of layers with one or more object models from the storage device 197. As discussed elsewhere herein the one or more geometric properties may reflect one or more of a size, curvature, curve fit, and shape fit of that layer. For instance, the one or more geometric properties include a multi-dimensional vector (e.g., 6D) containing properties associated with layer curvature, as discussed elsewhere herein.

In some embodiments, the method 400 may continue by the classification module 206 computing 414 for each object model a recognition score for each layer of the set of layers and determining a likelihood (e.g., a value) that the blob belongs to the object model by aggregating 416 (e.g., summing) the layer recognition scores. The method may proceed to compare the set of layers of each blob to find the best match as shown in block 408 and based on all of the likelihood values, the classification module 206 may recognize the blob by determining the object model the blob belongs to. For instance, the object blob may be classified as a person blob and the classification module 206 may recognize the person associated with the person blob based on the matching object model. In some cases, the object model associated with the highest likelihood may be determined as the matching object model. This determination may in some cases be dependent on the likelihood value satisfying a minimum likelihood threshold.

Figure 5:
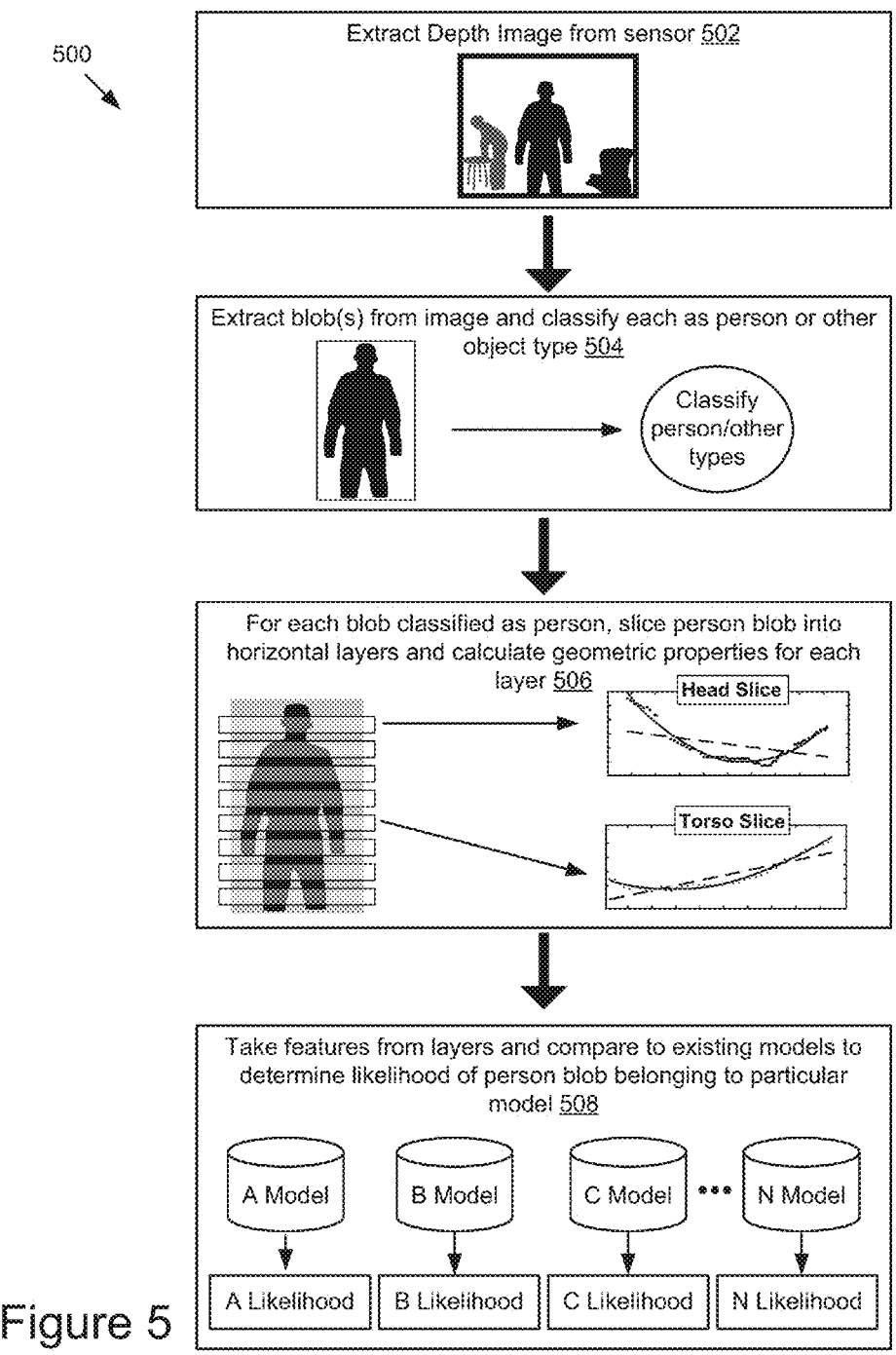
FIG. 5 is a diagram of an example method for detecting people blobs, slicing the people blobs into layers, and comparing the layers existing user models to recognize the people associated with the people blobs.

FIG. 5 is a diagram of an example method 500 for detecting people blobs, slicing the people blobs into layers, and comparing the layers existing user models to recognize the people associated with the people blobs. In essence, FIG. 5 describes the flow of information from the depth image to a recognition score. In block 502, a depth image is extracted 502 from the sensor (e.g. stereo camera, structured light camera, time-of-flight camera, etc.). In block 504, blob(s) are extracted from the image and classified as person or other type of object. In block 506, for each blob is classified as a particular object type (in this case a person), that blob is sliced into horizontal layers/slices and one or more geometric properties for each layer is computed. In block 508, for each blob, the features from select or all layers are compared to existing (trained, untrained, etc.) object models to determine if the person blob belongs to a particular model.

Figure 11:
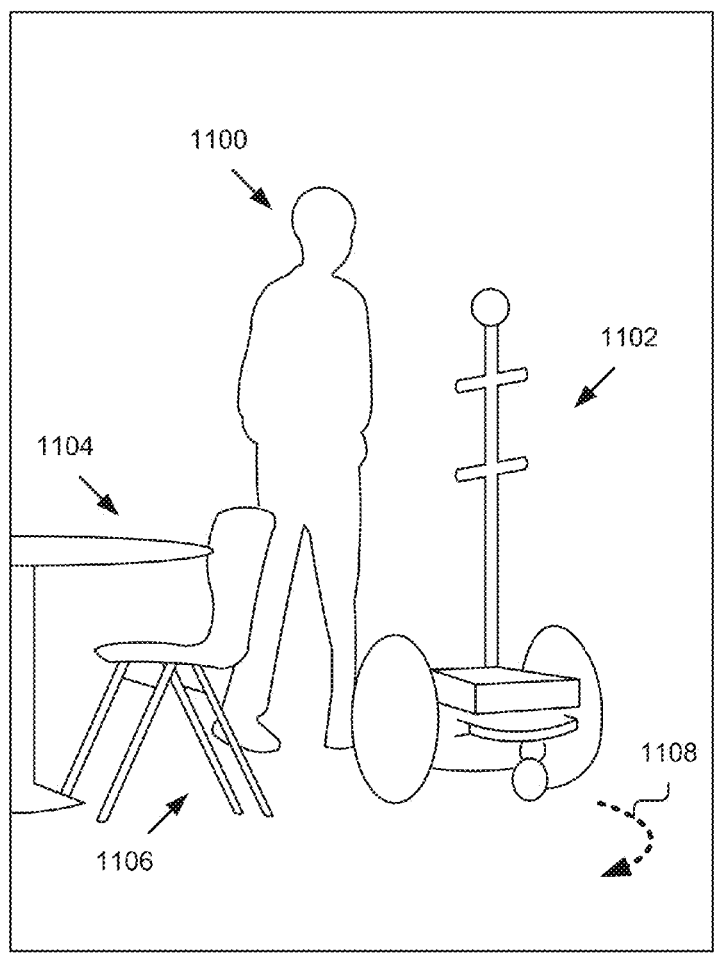
FIG. 11 illustrates an example application of the detection technology.

FIG. 11 illustrates an example application of the detection technology. As shown, the detection technology can provide a navigational aid for blind individuals. For instance, a robot equipped with the detection module 135 can help vision impaired people not only move through difficult and crowded environments, but also assist in describing the world around them. The robot companion can detect, recognize, and track their human partner as well as detect and recognize other people in the surroundings, and can do so while actively moving, navigating around obstacles, and recalculating paths to a goal. It can also work inside and outside, under all sorts of lighting conditions, and in many different ranges to the person is trying to track. FIG. 11 in particular depicts an example blind air robot 1102 leading a human partner 1100 through an indoor office environment (e.g., around detected obstacles such as a chair or a table). The robot is configured to track people and investigate the environment. For instance, the robot can detect the table and chair and inform the human partner of its existence and location should the human partner wish to sit down. In some embodiments, the robot could be configured to constantly communicate the direction of motion to the human via a physical communication medium, such as a tactile-belt around the individual's waist. The direction of motion 1108 may be computed by the robot based on the person's detected location.

By way of further illustration, in the example scenario depicted in FIG. 11, envision that the human partner 1100 began behind the detection system 103 (a robot) and followed it around a curve 1108 that passed between a large pillar (or right, not depicted) and a waist high counter top 1104. On average, the human partner 1100 maintained approximately a 1.5 m distance from the robot. At times, this distance increased to as much as 3 m when the robot had to get around the curve and out of the way. To track the person, the sensor 155 was mounted at chest level facing to the rear. This sensor recorded RGB and depth images at 30 Hz using multiple processing threads, and 14 Hz using a single processing thread (e.g., in comparison with other solutions that only yielded 10 Hz using a single processing thread). The first 1000 images captured had the following characteristics:

890 images containing part of a person;
719 images with visible shoulders and/or eyes;
171 images with only a partially visible person missing eyes and at least one shoulder (e.g. off the side of the image); and
331 images with 2 people visible or partially visible.

Figure 12A:
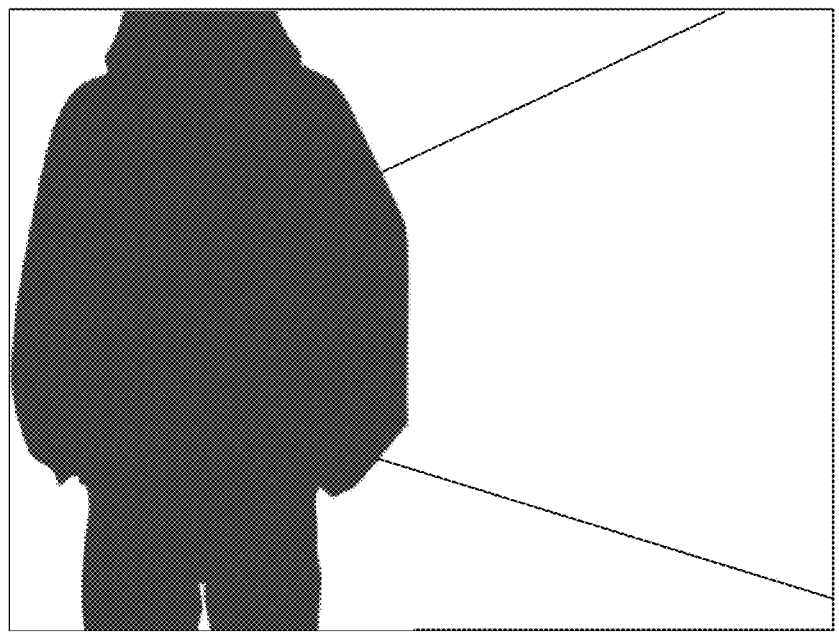
FIGS. 12A-12C depict representations of example images captured by a sensor.
Figure 12B:
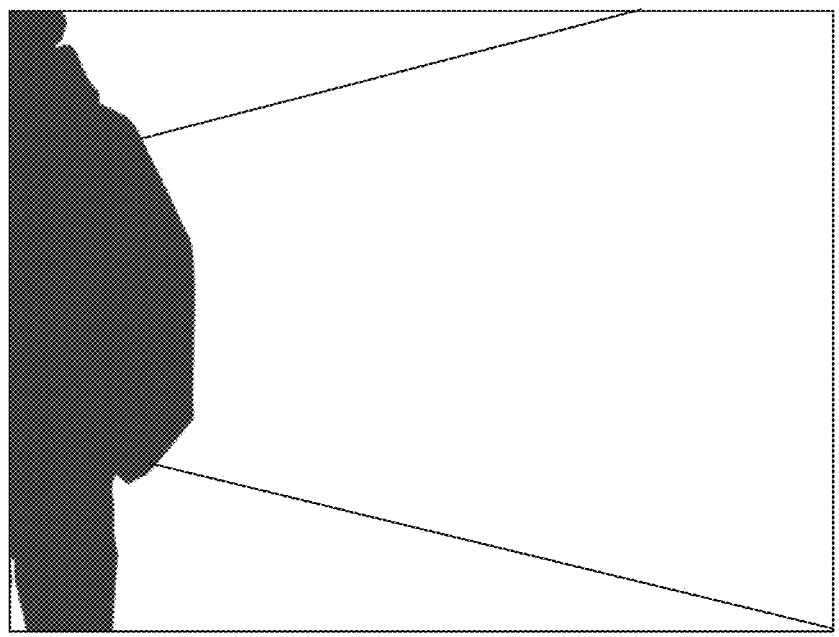
Figure 12C:
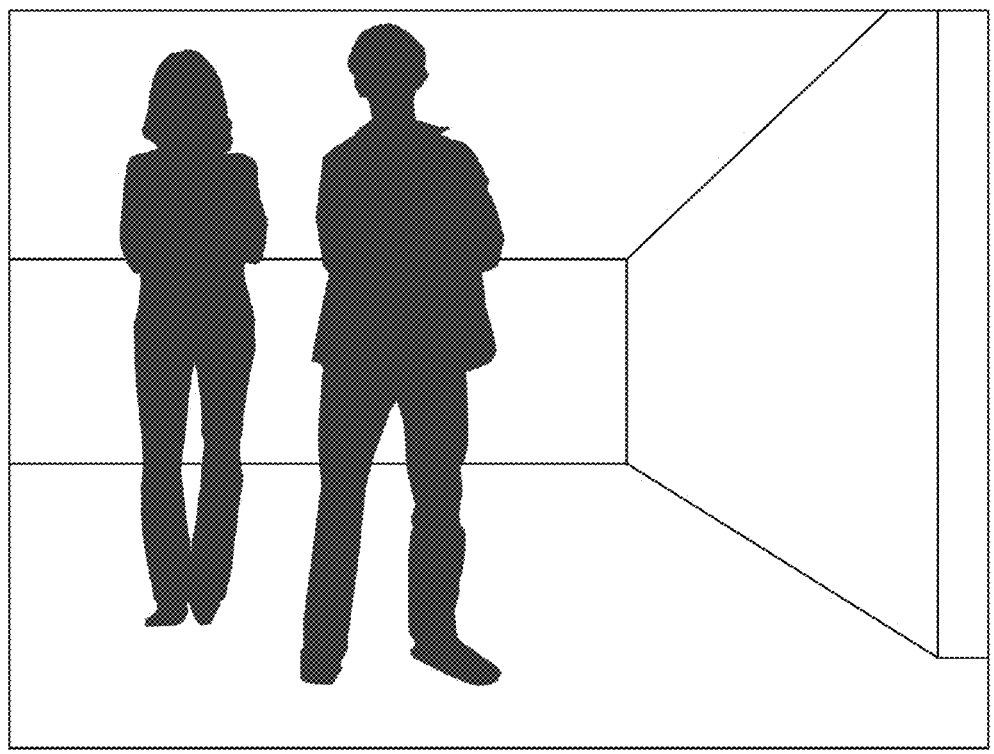

Examples of these images are depicted in FIGS. 12A, 12B, and 12C. In particular, FIG. 12A depicts a common close-range view of the human partner. The head and legs are missing because the sensor 155 was wide enough in angle to capture everything at that close range. The image in FIG. 12B was also very common. In addition to the human partner's face being partially off screen, only one shoulder is visible as the human partner strayed to the side of the path, which is also representative of being blocked by various other vertical obstructions, like pillars, wall corners, and doors. The image in FIG. 12C depicts two people in frame.

The following table shows example statistics collected during the example robot guidance scenario.

| | Performance of the detection technology on the guidance scenario dataset. | | | | |
|---|---|---|---|---|---|
| | False Positive | False Negative | False Negative (Partial Body) | Missing $2^{nd}$ Person | Speed (multi-thread) |
| Polyfit, GMM | 14/1000 (0.1%) | 0/719 (0%) | 43/171 (25.1%) | 195/331 (58.9%) | >30 Hz |

In this scenario, the human partner was detected in every full frontal frame, and was missed in only 25% of the blobs with horizontal occlusions. A second person that also appeared in frame was detected 41% of the time, without a significant increase in false positive rate. The training data used for this scenario is described below.

During this scenario, another people detection algorithm was evaluated side-by-side with the detection technology on two larger data sets: 1) moving people and/or robot—evaluated with Microsoft Kinect and a stereo vision system; and 2) people at different relative rotations—evaluated in two locations: a) inside; and 2) in direct sun with the stereo vision system.

For 1), a total of 14,375 images were collected using the rear facing Kinect sensor on the robot. They were collected over 7 different runs ranging in duration from two minutes to 15 minutes. The two shortest runs involved simply moving around in front of the camera. The remaining runs involve the scenario where a person followed the robot through an environment. All but one run contained at least two people. In order to train the detection system, a human trainer manually input examples of people and other objects in the image set. Objects were tracked between successive frames by tabulating a blob similarity score to limit the required input from the trainer. 5736 positive examples, and 9197 negative examples were identified in this fashion using the Kinect dataset.

Additional data was collected using a stereo image system (Point Grey XB3) mounted in place of the Kinect. For computational efficiency, block matching with an 11×11 pixel window size was utilized to identify disparity between frames. In addition to testing the robot indoors, the robot was also taken outside in both sunlight and shady areas. A total of 7778 stereo images were collected over five trials. 5181 positive examples, and 2273 negative examples were collected in this manner. Because of the increased noise in the stereo data, fewer objects crossed an example minimum threshold of 500 pixels to be considered for people detection.

In the above scenario, the detection technology decreased the false negative rate to 0% with horizontal occlusions, without increasing the false negative rate for vertical occlusions or decreasing the speed. In more difficult, larger scenarios with more than one moving person, a performance improvement of more than 5% was achieved. This performance difference was demonstrated with various sensors both inside and outside. The addition of depth-based blob tracking across sequential frames can even further improve the percentage of time people are detected by the robot.

Figure 10A:
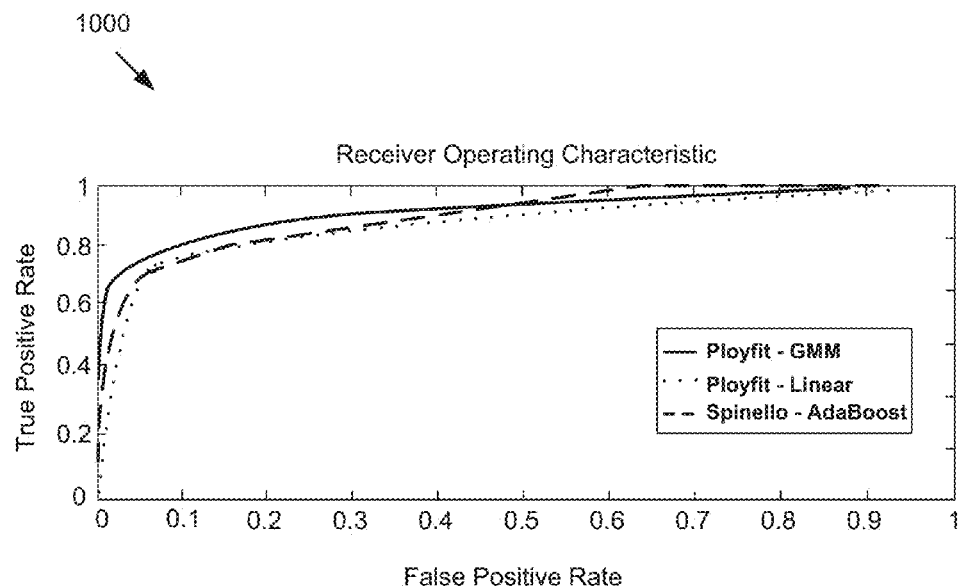
FIGS. 10A-10B are graphs showing an example comparison between two different types of sensors.
Figure 10B:
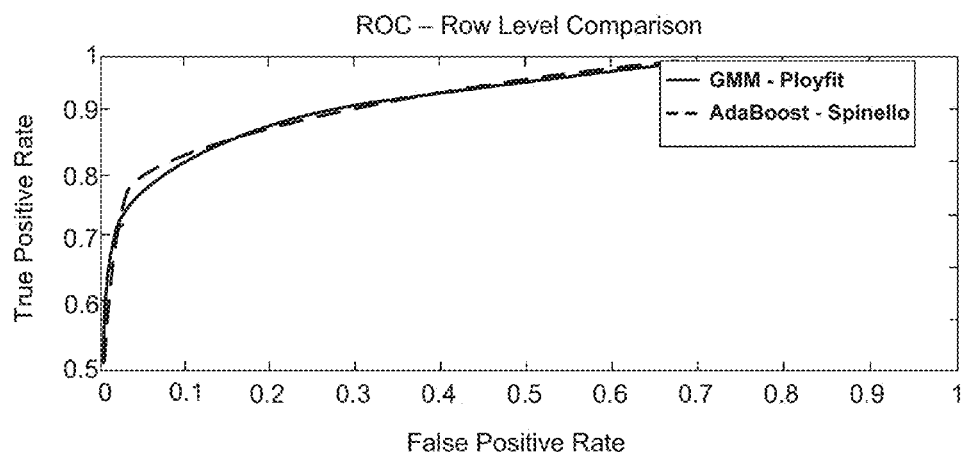

FIGS. 10A and 10B are graphs showing an example comparison between two different types of sensors. In particular, FIG. 10A illustrates the row level accuracy for people detection using Microsoft Kinect and FIG. 10B illustrates the row level accuracy for people detection using the stereo vision system. FIG. 10A includes performance estimates for three different algorithms: (1) the Spinello algorithm; (2) the set of properties with a linear classifier (Polyfit-Linear); and (3) the set of properties with a GMM (Polyfit-GMM). FIG. 10A includes performance estimates for two different algorithms: (1) the Spinello algorithm; and (3) the set of properties with a GMM (Polyfit-GMM).

With reference to FIG. 10A, when examined on a segment by segment, or row level, basis, there is little difference in ROC between the Polyfit-Linear curve and the Spinello curve. Using the novel, smaller set of geometric properties (e.g., 6D vector) is comparable without the additional computational overhead. However, with the addition of the GMM to the new features, the detection technology described herein performs significantly better and, at an estimated 3% false positive rate, provides a 3.6% improvement in the true positive rate. Over the entire ROC curve, it provides a 2.5% increase in the area.

Figure 10C:
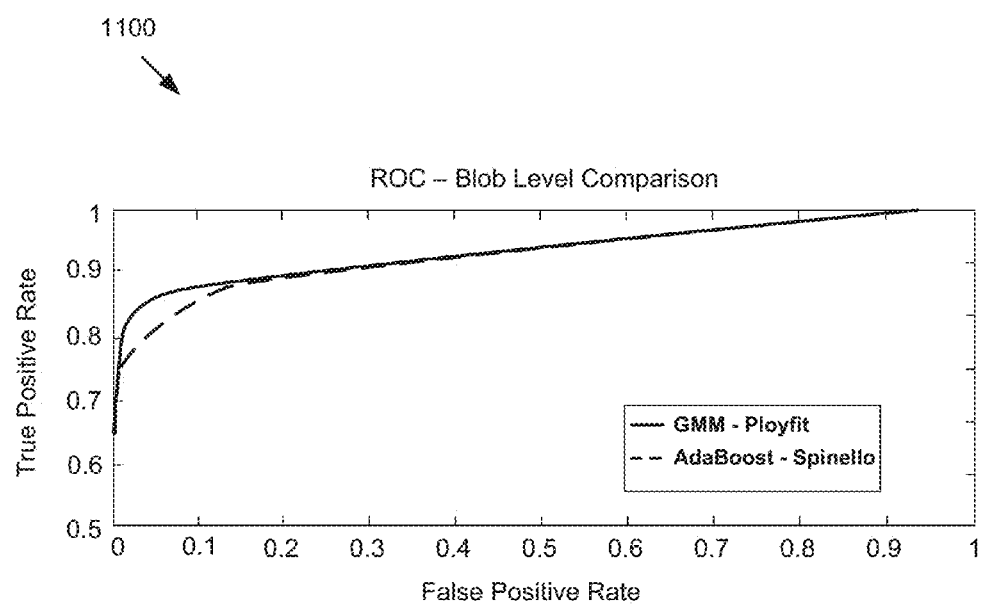
FIG. 10C is a graph showing a blob-level comparison between the novel technology described herein and another alternative.

With reference to FIG. 10B, there is less difference between feature sets, which may be due, in part, to the filtering inherent to the block matching disparity calculations, which can round edges and widen holes during blob extraction. However, FIG. 10C is a graph showing a blob-level comparison between the novel technology described herein and another alternative. In this figure, a blob-level comparison of ROC curves for Polyfit-GMM and the Spinello algorithm demonstrates more pronounced performance improvement with the stereo vision system using the detection technology described herein. In particular, the use of Polyfit-GMM with the set of geometric properties bumps up performance in the critical region from 0-10% false positive rate. At a 3% false positive rate, the new algorithm achieves 83.4% true positive rate vs. the Spinello algorithm's 77.8%.

In the above example scenario, the people objects were moving, or the robot was moving, or both moving through the environment during recognition, and as a result, a majority of the people detected were facing the camera and were generally occluded to some degree. In a second example scenario, the following set of example data demonstrates the effectiveness of people detection at different relative orientations to the camera, which is generally an important aspect of human robot interaction.

In this second scenario, a group of 29 different people stood and rotated in place in front of the sensor 155 while being captured. 20 people (15 men and 5 women) in the group were evaluated in an interior room with no windows and 24 people (17 men and 7 women) in the group were evaluated in front of floor to ceiling windows with full sun. 14 people participated in both environments. The sensor 155 used for this experiment included the stereo vision system. Detection models were trained using the data set from the guidance scenario described herein, in which a total of six people, all male, were present in training data set. The following table summarizes the results of the second scenario.

| | False negative rates for interior room vs. window, for each gender. | | |
|---|---|---|---|
| | Male | Female | Overall |
| Interior Room | 2/1893 (0.1%) | 82/533 (15.4%) | 3.5% |
| Next to Window | 107/2208 (3.8%) | 193/764 (25.3%) | 10.5% |

While there are differences between detection rates for the two types of lighting conditions, which is likely due to the effects of full sun on stereo disparity calculations, the detection technology correctly identified the male persons more than 95% of the time (e.g., 99.9% in interior room and 95.2% near window). Because there were no women in the training data, the rates for correctly identifying women were lower. However, even without training, 84.6% of the women were correctly identified in the interior room and 74.7% of the women were correctly identified when next to the window. The false negative identifications were dominated by women of slight build and/or long hair (i.e., with less curvature), which could be could be improved by broadening the training set.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   determining, using one or more computing devices, a depth image;
   detecting, using the one or more computing devices, an object blob in the depth image;
   segmenting, using the one or more computing devices, the object blob into a set of layers;
   extracting, using the one or more computing devices, one or more geometric properties for each layer of the set of layers by fitting a line and a parabola to data points of each layer of the set of layers segmented from the object blob; and comparing, using the one or more computing devices, the one or more geometric properties associated with each layer of the set of layers with a set of object models to determine a match.

2. The computer-implemented method of claim 1, wherein comparing the one or more geometric properties associated with each layer of the set of layers with the set of object models includes:
   determining, using the one or more computing devices, a likelihood of the object blob as belonging to each of the object models;
   determining the object blob to match a particular object model based on the likelihood.

3. The computer-implemented method of claim 2, wherein determining the likelihood of the object blob as belonging to the one of the object models includes:
   computing, using the one or more computing devices, a recognition score for each layer of the set of layers; and
   aggregating, using the one or more computing devices, the recognition score of each layer of the set of layers.

4. The computer-implemented method of claim 1, wherein extracting the one or more geometric properties for each layer of the set of layers includes determining, using the one or more computing devices, a curvature associated with the set of layers, and wherein comparing the one or more geometric properties associated with each layer of the set of layers with the object models includes evaluating the curvature using the object models.

5. The computer-implemented method of claim 1, wherein the one or more geometric properties includes a multi-dimensional vector containing properties associated with layer curvature.

6. The computer-implemented method of claim 1, wherein the one or more geometric properties reflect one or more of a size, curvature, curve fit, and shape fit.

7. The computer-implemented method of claim 1, wherein detecting the object blob in the depth image includes:
   detecting a plurality of blobs associated with a plurality of objects depicted by the depth image; and
   classifying each blob from the plurality of blobs as a person blob or other blob type based on a shape of the blob.

8. The computer-implemented method of claim 7, further comprising:
   discarding each blob from the plurality of blobs that is classified as another blob type.

9. The computer-implemented method of claim 1, wherein the object blob is a person blob and the method further comprises recognizing, using the one or more computing devices, a person associated with the person blob based on the match.

10. The computer-implemented method of claim 1, wherein the set of layers includes one or more horizontal layers.

11. The computer-implemented method of claim 1, wherein the sensor includes one or more of a stereo camera, a structured light camera, and a time-of-flight camera.

12. A computer program product comprising a non-transitory computer-readable medium storing a computer-readable program, wherein the computer-readable program, when executed on one or more computing devices, causes the one or more computing devices to:
   determine a depth image;
   detect an object blob in the depth image;
   segment the object blob into a set of layers;
   extract one or more geometric properties for each layer of the set of layers by fitting a line and a parabola to data points of each layer of the set of layers segmented from the object blob; and
   compare the one or more geometric properties associated with each layer of the set of layers with a set of object models to determine a match.

13. The computer program product of claim 12, wherein to compare the one or more geometric properties associated with each layer of the set of layers with the set of object models includes:
   determining a likelihood of the object blob as belonging to each of the object models; and
   determining the object blob to match a particular object model based on the likelihood.

14. The computer program product of claim 13, wherein determining the likelihood of the object blob as belonging to the one of the object models includes:
   computing a recognition score for each layer of the set of layers; and
   aggregating the recognition score of each layer of the set of layers.

15. The computer program product of claim 12, wherein to extract the one or more geometric properties for each layer of the set of layers includes determining a curvature associated with the set of layers, and to compare the one or more geometric properties associated with each layer of the set of layers with the object models includes evaluating the curvature using the object models.

16. The computer program product of claim 12, wherein the one or more geometric properties includes a multi-dimensional vector containing properties associated with layer curvature.

17. The computer program product of claim 12, wherein the one or more geometric properties reflect one or more of a size, curvature, curve fit, and shape fit.

18. The computer program product of claim 12, wherein to detect the object blob in the depth image includes:
   detecting a plurality of blobs associated with a plurality of objects depicted by the depth image; and
   classifying each blob from the plurality of blobs as a person blob or other blob type based on a shape of the blob.

19. The computer program product of claim 18, wherein the computer-readable program, when executed on the one or more computing devices, further causes the one or more computing devices to:
   discard each blob from the plurality of blobs that is classified as another blob type.

20. The computer program product of claim 12, wherein the object blob is a person blob and the computer-readable program, when executed on the one or more computing devices, further causes the one or more computing devices to recognize a person associated with the person blob based on the match.

21. The computer program product of claim 12, wherein the set of layers includes one or more horizontal layers.

22. The computer program product of claim 12, wherein the sensor includes one or more of a stereo camera, a structured light camera, and a time-of-flight camera.

23. A system comprising:
   one or more processors;
   one or more memories storing instructions that, when executed by the one or more processors, cause the system to:
      determine a depth image;
      detect an object blob in the depth image;
      segment the object blob into a set of layers;
      extract one or more geometric properties for each layer of the set of layers by fitting a line and a parabola to data points of each layer of the set of layers segmented from the object blob; and compare the one or more geometric properties associated with each layer of the set of layers with a set of object models to determine a match.

24. The system of claim 23, wherein to compare the one or more geometric properties associated with each layer of the set of layers with the set of object models includes:
  determining a likelihood of the object blob as belonging to each of the object models; and
  determining the object blob to match a particular object model based on the likelihood.

25. The system of claim 24, wherein determining the likelihood of the object blob as belonging to the one of the object models includes:
  computing a recognition score for each layer of the set of layers; and
  aggregating the recognition score of each layer of the set of layers.

26. The system of claim 23, wherein
  to extract one or more geometric properties for each layer of the set of layers includes determining a curvature associated with the set of layers, and to compare the one or more geometric properties associated with each layer of the set of layers with the object models includes evaluating the curvature using the object models.

27. The system of claim 23, wherein the one or more geometric properties includes a multi-dimensional vector containing properties associated with layer curvature.

28. The system of claim 23, wherein the one or more geometric properties reflect one or more of a size, curvature, curve fit, and shape fit.

29. The system of claim 23, wherein to detect the object blob in the depth image includes:
  detecting a plurality of blobs associated with a plurality of objects depicted by the depth image; and
  classifying each blob from the plurality of blobs as a person blob or other blob type based on a shape of the blob.

30. The system of claim 29, wherein the instructions, when executed by the one or more processors, further cause the system to:
  discard each blob from the plurality of blobs that is classified as another blob type.

31. The system of claim 23, wherein the object blob is a person blob and the instructions, when executed by the one or more processors, further cause the system to recognize a person associated with the person blob based on the match.

32. The system of claim 23, wherein the set of layers includes one or more horizontal layers.

33. The system of claim 23, wherein the sensor includes one or more of a stereo camera, a structured light camera, and a time-of-flight camera.

* * * * *